United States Patent
Bushman et al.

(10) Patent No.: US 8,000,727 B1
(45) Date of Patent: Aug. 16, 2011

(54) OPTICAL IMAGE PROCESSING FOR ACCESSING BUILDING CONTROL FROM A WIRELESS COMMUNICATION DEVICE

(75) Inventors: Serge J. L. Bushman, Overland Park, KS (US); Michael Gailloux, Overland Park, KS (US); Carl Joseph Persson, Olathe, KS (US); Thomas Henry Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 423 days.

(21) Appl. No.: 12/251,595

(22) Filed: Oct. 15, 2008

(51) Int. Cl.
*H04W 24/00* (2009.01)
*G08B 5/36* (2006.01)
*H04N 7/14* (2006.01)

(52) U.S. Cl. ............... 455/456.5; 340/815.5; 348/14.02

(58) Field of Classification Search ............... 455/404.2, 455/411, 418, 419, 456.1–456.6, 457, 556.1, 455/557, 563, 566.1; 340/619, 815.54, 815.57; 382/115, 116, 140, 321; 348/14.02; 379/900, 379/910; 713/155, 161, 168, 169, 170, 176; 715/740–745, 763

See application file for complete search history.

(56) References Cited

U.S. PATENT DOCUMENTS

| | | | |
|---|---|---|---|
| 6,203,069 B1 | 3/2001 | Outwater et al. | |
| 6,264,106 B1 | 7/2001 | Bridgelall | |
| 6,513,017 B1 | 1/2003 | Howard et al. | |
| 6,745,234 B1* | 6/2004 | Philyaw et al. | ............... 709/217 |
| 6,816,075 B2 | 11/2004 | Grunes et al. | |
| 6,947,571 B1* | 9/2005 | Rhoads et al. | ............... 382/100 |
| 6,961,555 B1* | 11/2005 | Philyaw | ............... 455/403 |
| 6,993,573 B2 | 1/2006 | Hunter | |
| 7,068,170 B2 | 6/2006 | Green | |
| 7,088,220 B2* | 8/2006 | Kotzin | ............... 340/5.82 |
| 7,121,469 B2 | 10/2006 | Dorai et al. | |
| 7,146,179 B2* | 12/2006 | Parulski et al. | ............ 455/456.3 |
| 7,174,031 B2* | 2/2007 | Rhoads et al. | ............... 382/107 |
| 7,181,066 B1 | 2/2007 | Wagman et al. | |
| 7,190,835 B2 | 3/2007 | Durbin et al. | |
| 7,222,791 B2 | 5/2007 | Heilper et al. | |

(Continued)

FOREIGN PATENT DOCUMENTS

EP  0645728  3/1995

(Continued)

OTHER PUBLICATIONS

USPTO Office Action Summary dated Nov. 23, 2010 from U.S. Appl. No. 12/043,239.

(Continued)

*Primary Examiner* — Kamran Afshar
*Assistant Examiner* — Gerald Oliver

(57) ABSTRACT

A communication system wherein a wireless communication device optically receives an image of a location, processes the image to obtain image data, and transmits the image data and wireless communication device user information to a communication network as a control request. A server receives the control request and processes the image data and user information to determine the location. The server then processes the location to determine contact information for an authorizing party and transfers an authorization request to the authorizing party. If the server receives authorization from the authorizing party, then the server transfers a control interface to the wireless communication device. The wireless communication device receives a control instruction responsive to the control interface and transfers a control message to the server. The server receives the control message and transfers the control message to a control system at the location. The control system implements the control instruction.

20 Claims, 6 Drawing Sheets

U.S. PATENT DOCUMENTS

| | | | |
|---|---|---|---|
| 7,224,995 B2* | 5/2007 | Rhoads | 455/550.1 |
| 7,274,931 B2 | 9/2007 | Harris | |
| 7,274,949 B2* | 9/2007 | Tanaka | 455/556.1 |
| 7,406,214 B2* | 7/2008 | Rhoads et al. | 382/289 |
| 7,424,282 B2* | 9/2008 | Barbeau | 455/404.1 |
| 7,428,321 B1* | 9/2008 | Shah et al. | 382/118 |
| 7,444,130 B2* | 10/2008 | Stepanian | 455/344 |
| 7,450,740 B2* | 11/2008 | Shah et al. | 382/118 |
| 7,523,866 B2 | 4/2009 | Longacre, Jr. et al. | |
| 7,536,034 B2* | 5/2009 | Rhoads et al. | 382/107 |
| 7,542,753 B2* | 6/2009 | Stepanian | 455/344 |
| 7,587,070 B2* | 9/2009 | Myers et al. | 382/118 |
| 7,599,527 B2* | 10/2009 | Shah et al. | 382/118 |
| 7,634,065 B2 | 12/2009 | Fukunaga et al. | |
| 7,668,348 B2* | 2/2010 | Shah et al. | 382/118 |
| 7,747,259 B2* | 6/2010 | Pande et al. | 455/456.5 |
| 7,852,196 B1* | 12/2010 | Adams | 340/5.86 |
| 2002/0052211 A1 | 5/2002 | Kim et al. | |
| 2002/0078363 A1 | 6/2002 | Hill et al. | |
| 2003/0156032 A1 | 8/2003 | Adams et al. | |
| 2003/0229678 A1 | 12/2003 | Wen et al. | |
| 2003/0233432 A1 | 12/2003 | Davis et al. | |
| 2004/0145613 A1 | 7/2004 | Stavely et al. | |
| 2004/0153553 A1 | 8/2004 | Chotkowski et al. | |
| 2005/0011957 A1 | 1/2005 | Attia et al. | |
| 2005/0029354 A1 | 2/2005 | Frantz et al. | |
| 2005/0044179 A1 | 2/2005 | Hunter | |
| 2005/0173524 A1 | 8/2005 | Schrader | |
| 2006/0002591 A1 | 1/2006 | Hombo | |
| 2006/0020614 A1 | 1/2006 | Kolawa et al. | |
| 2006/0026048 A1 | 2/2006 | Kolawa et al. | |
| 2006/0042139 A1 | 3/2006 | Mendes | |
| 2006/0212938 A1 | 9/2006 | Suzuki | |
| 2007/0061242 A1 | 3/2007 | Ramer et al. | |
| 2007/0061243 A1 | 3/2007 | Ramer et al. | |
| 2007/0061303 A1 | 3/2007 | Ramer et al. | |
| 2007/0083381 A1 | 4/2007 | Farrell et al. | |
| 2007/0133567 A1 | 6/2007 | West et al. | |
| 2007/0150588 A1 | 6/2007 | Ghadialy et al. | |
| 2007/0290045 A1 | 12/2007 | Cisar | |
| 2007/0290499 A1 | 12/2007 | Tame | |
| 2009/0086045 A1 | 4/2009 | Giebel et al. | |
| 2010/0041968 A1 | 2/2010 | Meschisen et al. | |

FOREIGN PATENT DOCUMENTS

| | | |
|---|---|---|
| JP | 2008090512 | 4/2008 |
| WO | WO-2006107610 | 10/2006 |

OTHER PUBLICATIONS

Avocent, "Environmentally-conscious Council Gives Green Light to SonicAdmin Mobile Software," Case Study, 2005, 2 pages, Avocent, Huntsville, Alabama, http://www.avocent.co.uk/web/uk.nsf/AttachmentsByTitle/USGreenBldgCouncil-SonicCS1005.pdf/$FILE/USGreenBldgCouncil-SonicCS1005.pdf.

Jan Harris, "Accelerometers Could Enhance Camera Phone Pictures," Camera Core, Mar. 23, 2007, 3 pages, camera-core.co.uk, http://www.camera-core.co.uk/23-03-2007-accelerometers-could-enhance-camera-phonespictures.html.

Jewels et Jim, "Fashionable Medical I.D. Jewelry," May 8, 2008, 1 page, http://www.jewelsetjim.com/.

Livecycle, "Using Barcode Data in Processes," LiveCycle Workbench ES Help, Nov. 20, 2008, 3 pages, LiveCycle, ttp://livedocs.adobe.com/livecycle/es/wb_help/wwhelp/wwhimpl/common/html/wwhelp.htm?context=Workbench_ES&file=00001152.html.

PROJECTRESPONDER.COM, "Medical Alert Bracelet," May 8, 2008, 3 pages, http://www.projectresponder.com/medical-alert-bracelet~139.htm.

Pegasus Imaging Corporation, "Using Barcodes in Documents—Best Practices," Barcode Basics, 2007, pp. 1-9, Pegasus Imaging Corporation, http://www.pegasusimaging.com/BarcodesinDocuments-BestPractices.pdf.

Popular Electronics, "Apple Unlocked GSM Cell Phone," Nov. 21, 2008, 3 pages, Popular Electronics, http://www.popularelect.com/index.php?cPath=21_62.

Popular Electronics, "Nokia N82 Unlocked Quad Band GSM 5+ Megapixel Camera Cell Phone," Nov. 21, 2008, 3 pages, Popular Electronics, http://www.popularelect.com/product_info.php?products_id=875&osCsid=d9b4eb6c7150c354f9fc573c748b2c06.

Xiaoming Zhao, et al., "Integration of Information Technology, Wireless Networks, and Personal Digital Assistants for Triage and Casualty," Telemedicine and e-Health, Aug. 1, 2006, 2 pages, vol. 12, No. 4, Mary Ann Liebert, Inc., New Rochelle, New York, http://www.liebertonline.com/doi/abs/10.1089/tmj.2006.12.466?cookieSet=1&journalCode=tmj.

\* cited by examiner

US 8,000,727 B1

OPTICAL IMAGE PROCESSING FOR ACCESSING BUILDING CONTROL FROM A WIRELESS COMMUNICATION DEVICE

TECHNICAL BACKGROUND

Homes and buildings are becoming more automated. These "smart" buildings have a central control system that controls many aspects of the building, such as the HVAC, lighting, and alarm system. These central control systems may have a proprietary remote by which a user can control these aspects.

Most people carry a wireless telephone. The wireless telephones in use today are able to run various programs. Additionally, the phones' wireless communication abilities allow them to work almost anywhere. Wireless telephones and building control systems have not been effectively configured to allow secure access to the control system for someone with a wireless telephone.

OVERVIEW

A communication system wherein a wireless communication device optically receives an image of a location and processes the image to generate image data that represents the location. The wireless communication device transfers a control request indicating an identification code associated with a user of the wireless communication device and indicates the image data to a communication network.

A server receives the control request from the communication network. The server processes the identification code to identify the user, processes the image data to identify the location, and processes the location to determine contact information for an authorizing party. The server then transfers an authorization request indicating the contact information, the location, and the user of the wireless communication device to the communication network for delivery to the authorizing party.

The server receives an authorization response from the communication network transferred by the authorizing party. If the authorization response is positive, then the server transfers a control interface to the communication network for delivery to the wireless communication device.

The wireless communication device receives the control interface from the communication network and displays the control interface. The wireless communication device receives a control instruction from the user responsive to the control interface and wirelessly transfers the control instruction to the communication network.

The server receives the control instruction from the communication network and transfers the control instruction to the communication network for delivery to a control system at the location. The control system receives the control instruction from the communication network and implements the control instruction.

DETAILED DESCRIPTION

Figure 1:
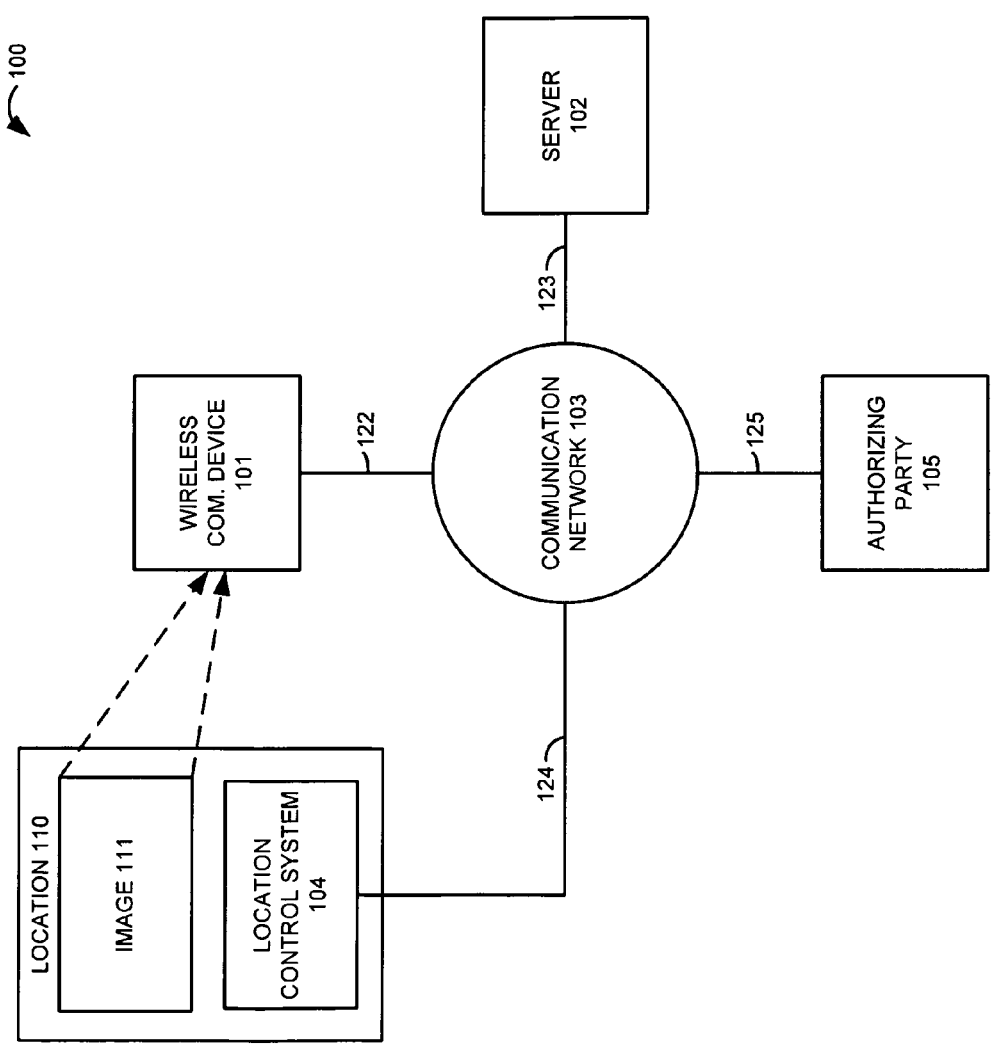
FIG. 1 is a block diagram that illustrates a wireless communication system.

FIG. 1 is a block diagram that illustrates wireless communication system 100. Wireless communication system 100 comprises wireless communication device 101, server 102, communication network 103, authorizing party 105 and location 110. Location 110 includes image 111 and location control system 104. Examples of image 111 include a photograph of location 110, a two-dimensional barcode, symbol, graphic, printed data set, or any other optically receivable image that could identify location 110. Examples of location 110 include an office building, a personal residence, a park, or some other location.

Wireless communication device 101 optically receives image 111 from location 110 as indicated on FIG. 1 by dashed lines. Wireless communication device 101 and communication network 103 wirelessly exchange communications over wireless link 122. Server 102 and communication network 103 exchange communications over communication link 123. Location control system 104 and communication network 103 exchange communications over communication link 124. Authorizing party 105 and communication network 103 exchange communications over communication link 125.

Wireless communication device 101 comprises a telephone, transceiver, computer, digital assistant, mobile Internet access device, or some other wireless communication apparatus—including combinations thereof. Wireless communication device 101 has a camera or some other optical receiver.

Server 102 is a computer system comprising a communication interface, a user interface, and a processing system. The communication interface comprises components that allow server 102 to communication with communication network 103. The processing system includes a storage device that stores operating software. The processing system also includes circuitry configured to execute the instructions of the operating software. The circuitry comprises a microprocessor, memory, and other circuitry that retrieves and executes the operating software from the storage device.

Communication network 103 comprises wireless access points, telephony switches, Internet routers, network gateways, computer systems, communication links, or some other type of communication equipment—including combinations thereof. Wireless link 122 uses air or space as the transport media. Wireless link 122 could use various protocols, such as wireless fidelity, code division multiple access, worldwide interoperability for microwave access, GSM, LTE, internet, telephony, or some other communication format—including combinations thereof. Communication links 123-125 use various communication media, such as air, metal, optical fiber, or some other signal propagation path—including combinations thereof. Communication links 123-125 use various protocols, such as internet, telephony, optical networking, wireless communication, wireless fidelity, code division multiple access, worldwide interoperability for microwave access, or some other communication format—including combinations thereof. Links 122-125 could be direct links or they might include various intermediate components, systems, and networks.

Location control system 104 is a computer system comprising a communication interface, a user interface, a processing system, and various sensors and location control elements. The communication interface comprises components that allow location control system 104 to communication with communication network 103. The processing system includes a storage device that stores operating software. The processing system also includes circuitry configured to execute the instructions of the operating software. The circuitry comprises a microprocessor, memory, and other circuitry that retrieves and executes the operating software from the storage device. The various sensors provide the processing system with data about the state of the location. The data may contain information about whether a door is open or closed, locked or unlocked, if a room is lit or unlit, temperature readings, or some other information useful in controlling a location. The location control elements include any elements that allow location control system to unlock doors, turn on lights, adjust temperature, control an appliance, or other elements a user might need to control.

Authorizing party 105 is a user of a communication device that has the ability to authorize control of location 110. Authorizing party 105 might be the user of another wireless communication device similar to wireless communication device 101.

Figure 2:
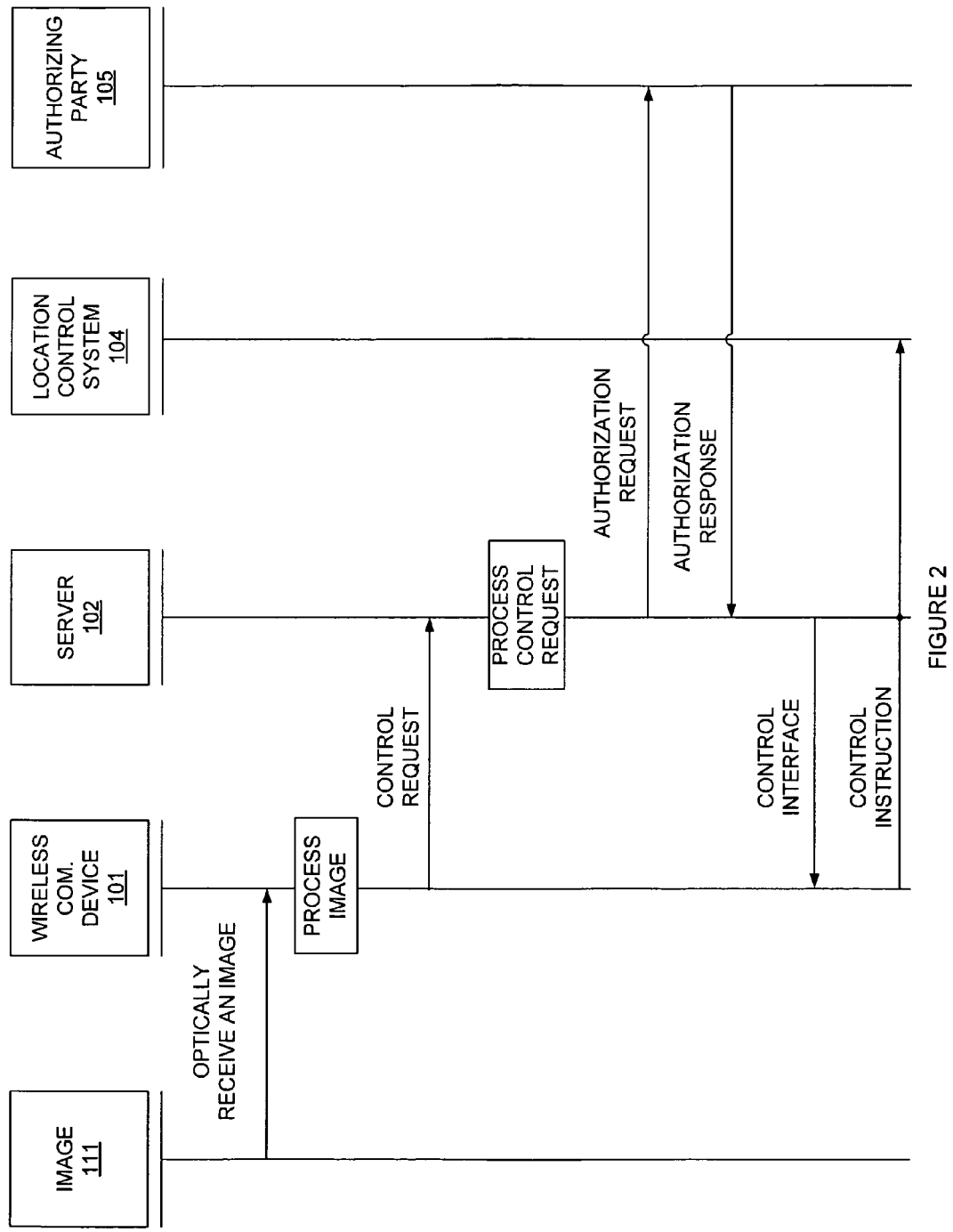
FIG. 2 is a sequence diagram that illustrates the operation of the wireless communication system.

FIG. 2 is a sequence diagram that illustrates the operation of wireless communication system 100. The operation starts when wireless communication device 101 optically receives image 111 from location 110 and processes image 111 to generate image data. The optical reception and processing of image 111 could be automatic or be responsive to a human input. For example, the user may operate a user interface to direct wireless communication device 101 to take a picture of image 111 and process the received image. Wireless communication device 101 transfers a control request to server 102. The control request includes an identification code associated with a user of the wireless communication device. The identification code could be an electronic serial number, a MAC address, a telephone number, or some other way to identify the user of wireless communication device 101. The control request includes the image data. Additionally, the control request might include location data for wireless communication device 101, such as GPS coordinates.

Server 102 receives the control request. Server 102 processes the identification code from the control request to identify the user of wireless communication device 101. Server 102 then processes the image data to identify location 110. If the control request includes location data for wireless communication device 101, then server 102 might process the location data to allow authorization of wireless communication device 101 only if wireless communication device 101 is at location 110. Server 102 then processes the location to determine contact information for authorizing party 105. The contact information may include a phone number, email address, electronic serial number, IP address, or some other information for contacting a communication device for authorizing party 105. Server 102 then transfers an authorization request to authorizing party 105. The authorization request indicates location 110 and the identity of the user of wireless communication device 101. For example, the user identity may include the GPS location and telephone number of wireless communication device 101, or the street address and name of the user of wireless communication device 101.

Authorizing party 105 receives the authorization request from server 102 and transfers an authorization response to server 102. Server 102 receives the authorization response from authorizing party 105. Upon determining that the authorization response is positive, server 102 transfers a control interface to wireless communication device 101. The control interface may be a webpage, a software program, or some other interface enabling wireless communication device 101 to send control commands for location control system 104. Wireless communication device 101 receives the control interface and displays it for the user. Wireless communication device 101 receives a control instruction from the user responsive to the control interface. The control instruction could be an instruction to unlock a door, turn on a light, adjust the temperature of a room, or some other action for location control system 104. Wireless communication device 101 transfers the control instruction to server 102. Server 102 forwards the control message to location control system 104.

Location control system 104 receives the control instruction from wireless communication device 101. Location control system 104 implements the control instruction in location 110.

Subsequent to authorizing wireless communication device 101, server 102 may transmit notification messages to authorizing party 105 informing authorizing party 105 about the control instructions issued by wireless communication device 101. Thus, authorizing party 105 is notified of all actions performed by the user of wireless communication device 101 after authorizing party 105 transmitted the authorization message. The notification messages may include control instruction information, which may contain the controlled location, the time, and the action taken by wireless communication device 101. Server 102 may transmit the notification messages upon receipt of each control instruction from wireless communication device 101, or it may transmit one notification message containing control instruction information for all control instructions occurring over a certain period of time.

For an added layer of security, PIN numbers may be used for identification conformation during the operation of wireless communication system 100. For example, wireless communication device 101 may require the user to input a PIN before transmitting the control request and before transmitting each control message. Additionally, authorizing party 105 may be required to enter a PIN before transmitting an authorization message.

In the above example, communication between wireless communication device 101, server 102, location control system 104, and authorizing party 105 occurs via communication network 103.

Figure 3:
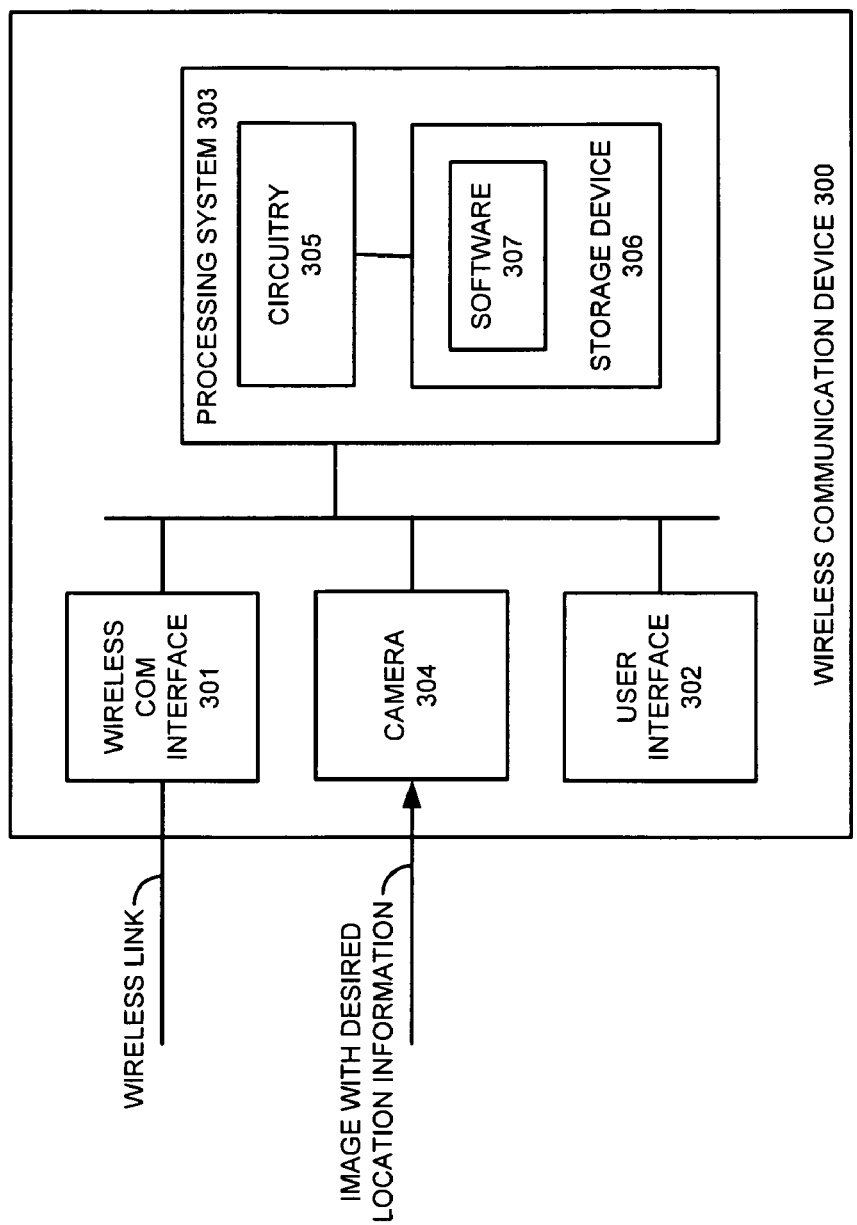
FIG. 3 is a block diagram that illustrates a wireless communication device.

FIG. 3 is a block diagram that illustrates wireless communication device 300 that provides image-controlled access to a building control system. Wireless communication device 300 is an example of wireless communication device 101, although wireless communications device 101 may use alternative configurations. Wireless communication device 300 comprises wireless communication interface 301, user interface 302, processing system 303, and camera 304. Processing system 303 is linked to wireless communication interface 301, user interface 302, and camera 304. Processing system 303 includes circuitry 305 and storage device 306 that stores operating software 307.

Wireless communication interface 301 comprises components that communicate over a wireless link under the control of processing system 303. Wireless communication interface 301 comprises an RF transceiver and antenna or some other wireless communication device. User interface 302 comprises components that interact with the user under the control of processing system 303. User interface 302 may include a speaker, microphone, buttons, lights, display screen, touch screen, touch pad, scroll wheel, or some other user input/output apparatus. Circuitry 305 comprises microprocessor and other circuitry that retrieves and executes operating software 307 from storage device 306 to control wireless communication interface 301, user interface 302, and camera 304. Storage device 306 comprises a disk drive, flash drive, memory circuitry, or some other memory device.

Operating software 307 comprises computer programs, firmware, or some other form of machine-readable processing instructions. Operating software 307 may include an operating system, utilities, drivers, network interfaces, applications, or some other type of software. When executed by circuitry 305, operating software 307 directs processing system 303 to operate wireless communication device 300 as described herein. In particular, operating software 307 directs processing system 303 to perform the image processing and location control as described herein.

Camera 304 is configured to optically receive images, convert the optical image into image data, and transfer the image data to processing system 303. Camera 304 operates in response to instructions from processing system 303. For example, the user may provide camera instructions through user interface 302, and in response, processing system 303 would direct camera to optically capture an image and provide the resulting image data to processing system 303. Camera 304 could be a wireless telephone camera or some other optical receiver.

Figure 4:
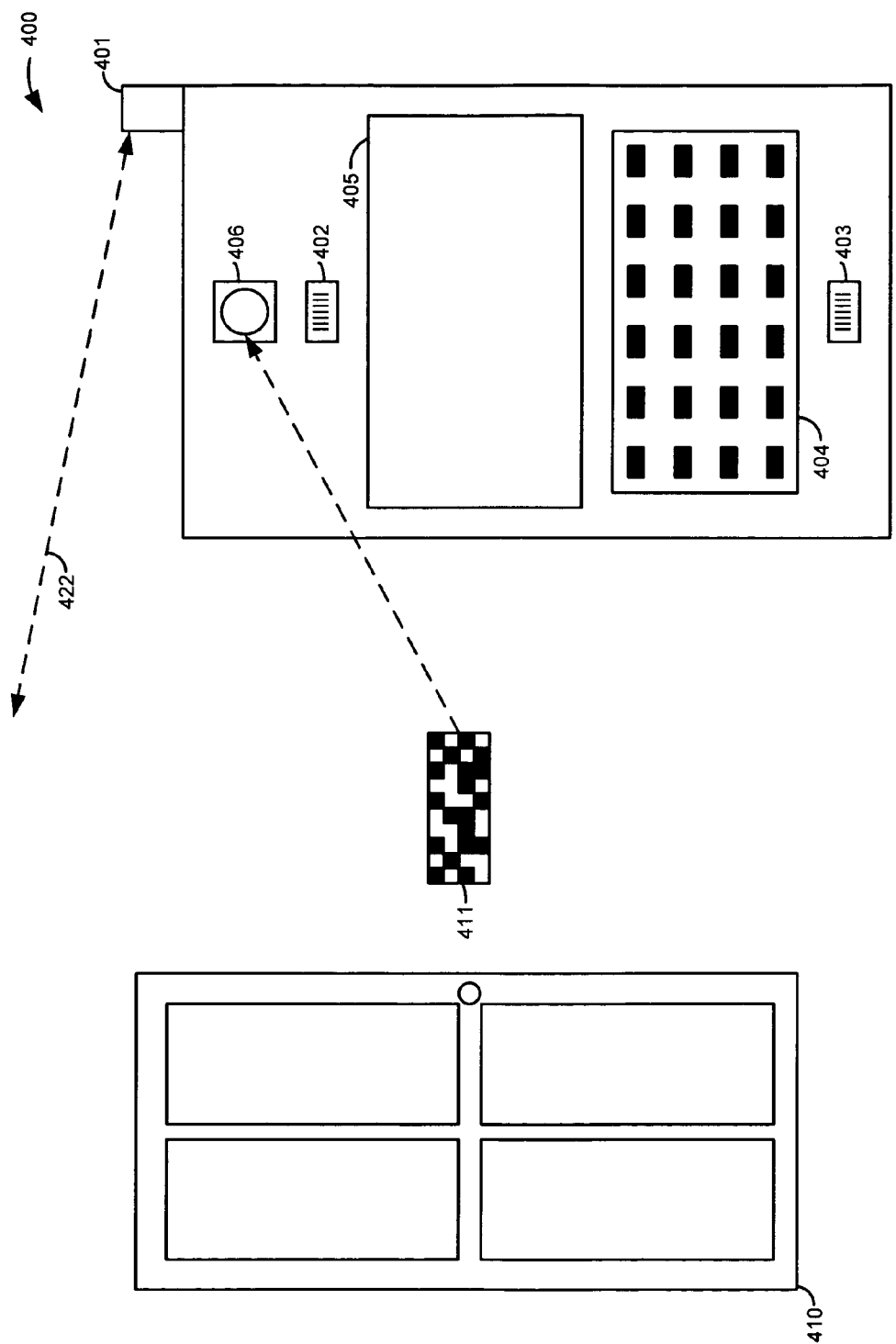
FIG. 4 is a sketch that illustrates a wireless telephone providing image determined building control in a commercial context.

FIG. 4 is a sketch that illustrates wireless telephone 400 in an example of the invention. Wireless telephone 400 includes antenna 401, speaker 402, microphone 403, keypad 404, display 405, and camera 406. Wireless telephone 400 communicates with a wireless communication network over wireless link 422. Two-dimensional bar code 411 is positioned next to door 410.

In this example, a user of wireless telephone 400 wants to gain access through door 410. Door 410 is locked. The user is a plumber that needs to get into a building through door 410 to work on the plumbing system. The plumber operates wireless telephone 400 to take a picture of two-dimensional bar code 411 next to door 410. Two-dimensional bar code 411 encodes the location information about door 410, such as what building door 410 is located in and the location of door 410 within the building. Wireless telephone 400 processes bar code 411 to produce corresponding image data having the location information about door 410. Wireless telephone 400 then transfers a control request to a server over a wireless communication network. The control request includes the image data and the telephone number of wireless telephone 400.

The server receives the control request from wireless telephone 400 over the wireless communication network. The server processes the image data to extract the location information about door 410 and determine contact information for an authorizing party. In this example, the authorizing party is the superintendent of the building in which door 410 is located. The server transfers a text message indicating the location of telephone number to the superintendent.

The server receives a reply text message from the superintendent authorizing the plumber to access door 410. The server then transfers a webpage to wireless telephone 400. The webpage displays a control menu to allow the plumber to unlock door 410 and adjust the lighting. The plumber uses the control interface to instruct that door 410 be unlocked and the lights turned on. Wireless telephone 400 transfers the control instruction over the communication network to the server. The server relays the control message to a control system for the building where door 410 is located. The control system in turn unlocks door 410 and turns on the lights.

Figure 5:
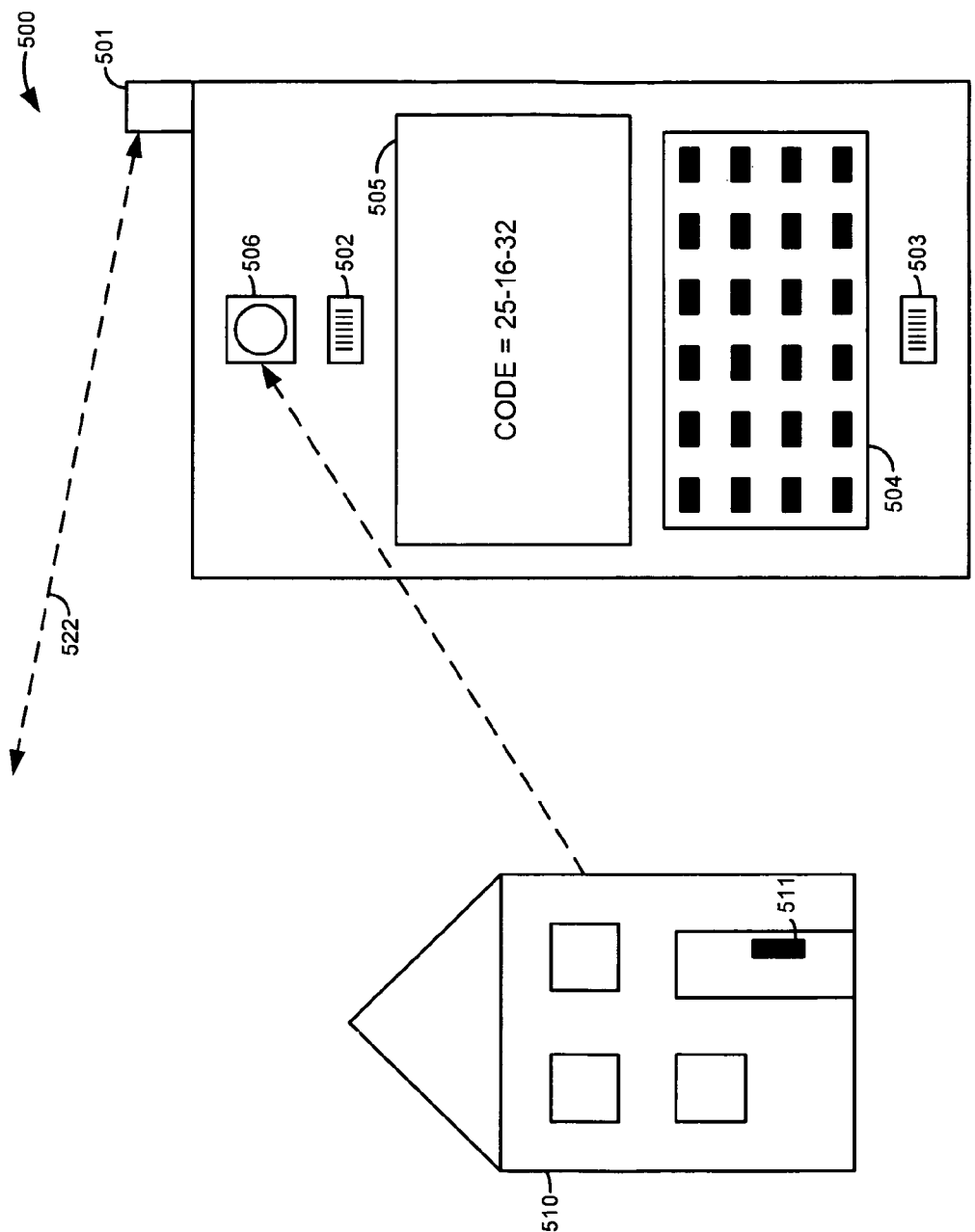
FIG. 5 is a sketch that illustrates a wireless telephone providing image determined building access in a real estate context.

FIG. 5 is a sketch that illustrates wireless telephone 500 in an example of the invention. Wireless telephone 500 includes antenna 501, speaker 502, microphone 503, keypad 504, display 505, and camera 506. Wireless telephone 500 communicates with a wireless communication network over wireless link 522. Lockbox 511 is located on the door of house 510.

In this example, a realtor is the user of wireless telephone 500. The realtor needs access to house 510 to show house 510 to clients. House 510 may be accessed using a key enclosed in lockbox 511. The realtor operates wireless telephone 500 to take a picture of house 510. Wireless telephone 500 processes the picture of house 510 to produce corresponding image data. The image data in this example would simply be the picture of house 510. Wireless telephone 500 then transfers a control request to a server over a wireless communication network. The control request includes the image data and an ESN of wireless telephone 500.

The server receives the control request from wireless telephone 500 over the wireless communication network. The server processes the ESN to identify the realtor as the user of wireless telephone 500. The server processes the image data to extract the location information about house 510. The server contains a listing of a set of homes for sale in the realtor's area. The server compares the picture of house 510 to the pictures of homes for sale in its database. Once the server finds a match, it must determine the contact information for an authorizing party. If there is an authorizing party, such as the owner of house 510, then the server sends an email request to the owner indicating that the realtor wishes to gain access to the house. Alternatively, the server itself may have a list of realtors who are authorized to access the homes on the server's list of homes for sale. Thereby, the server itself could authorize the realtor to enter the house without the need for an authorizing party.

Once the server receives authorization, the server sends a combination code "25-16-32" to wireless telephone 500. Wireless telephone 500 displays the combination code "25-16-32" on display 505. The realtor may then use the combination code to retrieve the key to house 510 from lockbox 511. Additionally, the server could establish a voice communication link between wireless telephone 500 and the owner of house 510 to allow the owner to give the realtor specific instructions or allow the realtor to ask the owner questions about the house.

Figure 6:
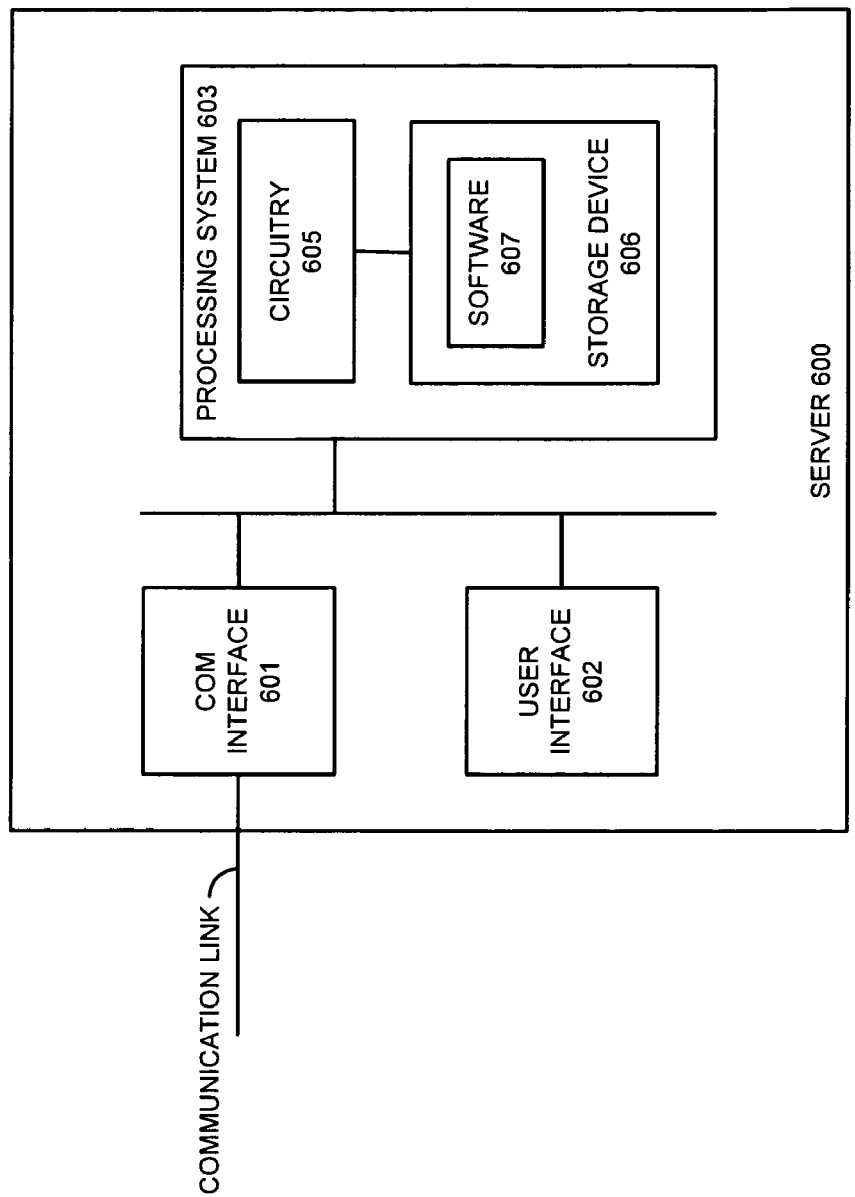
FIG. 6 is a block diagram that illustrates a server.

FIG. 6 is a block diagram that illustrates server 600 that provides image-controlled access to a building control system. Server 600 is an example of server 102, although server 102 may use alternative configurations. Server 600 comprises communication interface 601, user interface 602, and processing system 603. Processing system 603 is linked to communication interface 601 and user interface 602. Processing system 603 includes circuitry 605 and storage device 606 that stores operating software 607.

Communication interface 601 comprises components that communicate over a communication link under the control of processing system 603. User interface 602 comprises components that interact with the user under the control of processing system 603. User interface 602 may include a speaker, microphone, buttons, lights, display screen, touch screen, touch pad, scroll wheel, or some other user input/output apparatus. Circuitry 605 comprises microprocessor and other circuitry that retrieves and executes operating software 607 from storage device 606 to control wireless communication interface 601, user interface 602, and camera 604. Storage device 3606 comprises a disk drive, flash drive, memory circuitry, or some other memory device.

Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate server 600 as described herein. In particular, operating software 607 directs processing system 603 to perform the control request processing as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   in a wireless communication device, optically receiving an image of a location, processing the optically received image to generate image data that represents the location, and wirelessly transferring a control request indicating an identification code associated with a user of the wireless communication device and indicating the image data to a communication network;
   in a server, receiving the control request from the communication network, processing the identification code to identify the user, processing the image data to identify the location, processing the location to determine contact information for an authorizing party, and transferring an authorization request indicating the contact information, the location, and the user to the communication network for delivery to the authorizing party;
   in the server, receiving an authorization response from the communication network transferred by the authorizing party, and if the authorization response is positive, transferring a control interface to the communication network for delivery to the wireless communication device;
   in the wireless communication device, receiving the control interface from the communication network, displaying the control interface, receiving a control instruction from the user responsive to the control interface, and wirelessly transferring the control instruction to the communication network; and
   in the server, receiving the control instruction from the communication network and transferring the control instruction to the communication network for delivery to a control system at the location, wherein the control system receives the control instruction from the communication network and implements the control instruction.

2. The method of claim 1 wherein the identification code comprises a telephone number for the wireless communication device.

3. The method of claim 1 wherein the identification code comprises an electronic serial number for the wireless communication device.

4. The method of claim 1 wherein the identification code comprises a mobile identification number for the wireless communication device.

5. The method of claim 1 further comprising:
   in the wireless communication device, receiving an access code from the user and indicating the access code in the control request;
   in the server, processing the access code to authenticate the user and indicating the authentication in the authorization request.

6. The method of claim 1 further comprising:
   in the wireless communication device, determining location data for the location based on physical proximity of the wireless communication device to the location and indicating the location data in the control request;
   in the server, processing the location data to verify the physical proximity of the wireless communication device to the location and indicating the verified physical proximity in the authorization request.

7. The method of claim 1 wherein the control instruction comprises providing access to the location through a door.

8. The method of claim 1 wherein the image of the location comprises a barcode at the location.

9. The method of claim 1 wherein the image of the location comprises a photograph of the location.

10. The method of claim 1 comprising in the server executing a voice communication link between the wireless communication device and the authorizing party.

11. A wireless communication system comprising:
    a wireless communication device configured to optically receive an image of a location, process the optically received image to generate image data that represents the location, and wirelessly transfer a control request indicating an identification code associated with a user of the wireless communication device and indicating the image data to a communication network;
    a server configured to receive the control request from the communication network, process the identification code to identify the user, process the image data to identify the location, process the location to determine contact information for an authorizing party, and transfer an authorization request indicating the contact information, the location, and the user to the communication network for delivery to the authorizing party;
    the server further configured to receive an authorization response from the communication network transferred by the authorizing party, and if the authorization response is positive, transfer a control interface to the communication network for delivery to the wireless communication device;
    the wireless communication device further configured to receive the control interface from the communication network, display the control interface, receive a control instruction from the user responsive to the control interface, and wirelessly transfer the control instruction to the communication network; and
    the server further configured to receive the control instruction from the communication network and transfer the control instruction to the communication network for delivery to a control system at the location, wherein the control system receives the control instruction from the communication network and implements the control instruction.

12. The wireless communication system of claim 11 wherein the identification code comprises a telephone number for the wireless communication device.

13. The wireless communication system of claim 11 wherein the identification code comprises a telephone number for the wireless communication device.

14. The wireless communication system of claim 11 wherein the identification code comprises a mobile identification number for the wireless communication device.

15. The wireless communication system of claim 11 further comprising:
    the wireless communication device further configured to receive an access code from the user and indicate the access code in the control request;

the server further configured to process the access code to authenticate the user and indicate the authentication in the authorization request.

16. The wireless communication system of claim 11 further comprising:

the wireless communication device further configured to determine location data for the location based on physical proximity of the wireless communication device to the location and indicate the location data in the control request;

the server further configured to process the location data to verify the physical proximity of the wireless communication device to the location and indicate the verified physical proximity in the authorization request.

17. The wireless communication system of claim 11 wherein the control instruction provides access to the location through a door.

18. The wireless communication system of claim 11 wherein the image of the location comprises a barcode at the location.

19. The wireless communication system of claim 11 wherein the image of the location comprises a photograph of the location.

20. The wireless communication system of claim 11 wherein the server is further configured to execute a voice communication link between the wireless communication device and the authorizing party.

* * * * *